Figure 1:
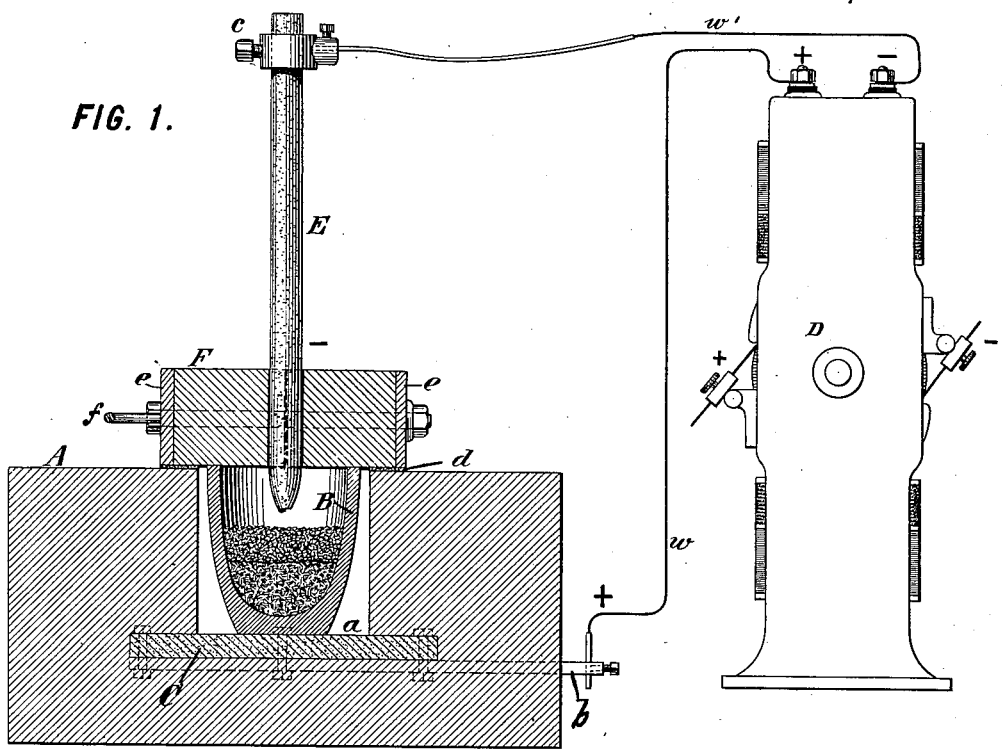

(No Model.) 2 Sheets—Sheet 1.

T. L. WILLSON.
PROCESS OF ELECTRICALLY REDUCING ALUMINIUM AND FORMING ALLOYS THEREOF.

No. 491,394. Patented Feb. 7, 1893.

WITNESSES:
John Becker
Fred White

INVENTOR:
Thomas L. Willson,
By his Attorneys,
Arthur C. Fraser & Co.

(No Model.) 2 Sheets—Sheet 2.

T. L. WILLSON.
PROCESS OF ELECTRICALLY REDUCING ALUMINIUM AND FORMING ALLOYS THEREOF.

No. 491,394. Patented Feb. 7, 1893.

WITNESSES:
John Becker
Fred White

INVENTOR:
Thomas L. Willson,
By his Attorneys,
Arthur O. Fraser & Co.

UNITED STATES PATENT OFFICE.

THOMAS L. WILLSON, OF BROOKLYN, NEW YORK.

PROCESS OF ELECTRICALLY REDUCING ALUMINIUM AND FORMING ALLOYS THEREOF.

SPECIFICATION forming part of Letters Patent No. 491,394, dated February 7, 1893.

Application filed March 25, 1891. Serial No. 386,301. (No specimens.)

*To all whom it may concern:*

Be it known that I, THOMAS L. WILLSON, a citizen of the United States, residing at Brooklyn, in the county of Kings and State of New York, have invented certain new and useful Improvements in Electrical Reduction of Aluminium and other Metals and the Production of Alloys Thereof, of which the following is a specification.

This invention relates to the reduction of aluminium and other metals from oxides or other refractory ores or metallic compounds by means of heat generated electrically.

The invention is characterized by subjecting the ore or compound to be reduced to the heat of an electric arc formed by passing an electric current through a gaseous space intervening between a bath of molten metal beneath and an electrode of any suitable material placed above, the operation being conducted in the presence of finely comminuted carbon as a reducing agent. In the making of an alloy, such as aluminium bronze, the base metal to be alloyed with the reduced metal constitutes the molten bath.

In practicing my invention, I place the metallic compound or ore to be reduced in a crucible, preferably of carbon, and connect the crucible with the positive terminal of a dynamo generating a suitable current. The crucible is covered over with a refractory cover having a hole through it, and through this hole is inserted a carbon rod or pencil which is connected to the negative terminal of the dynamo. On the current being established, it passes upwardly through the crucible to the carbon cathode, which is separated so as to form an arc, the heat of which fuses any base metal that may be present and reduces the metallic compound or ore. The oxygen eliminated by the reduction of the ore would be freed and would rapidly waste away the carbon pencil but for the provision of a reducing agent to combine with the liberated oxygen. This reducing agent consists of finely powdered carbon, such as lamp black or powdered coke or coal dust, which is introduced into the crucible either by being previously ground up and thoroughly mixed with the ore, or by being charged into the crucible from time to time or in a continuous stream during the reducing operation. The comminuted carbon thus introduced serves solely the chemical function of combining with the liberated oxygen and converting the latter into carbon monoxide or dioxide so that it shall be powerless to corrode and consume the negative carbon pencil. The introduction of pulverized carbon also serves to protect the upper part of the crucible from the corrosive action of the liberated oxygen. By thus protecting the carbon pencil and crucible from being eaten away, the reducing process is rendered much more economical than herétofore.

In the making of aluminium alloys by this process I prefer to use a pure alumina, such as commercial precipitated alumina. Or an ore which is as nearly as possible the pure oxide of aluminium may be used, such as corundum. I place in the bottom of the crucible a layer of fragments of the metal or an ore of the metal to be alloyed with aluminium, preferably copper. On this layer I place a layer of the alumina. The electric connections being made the carbon cathode is pressed down through the corundum until it touches the copper, whereupon the circuit is completed and the current passes. On lifting the cathode an arc is formed between the copper and the cathode, which quickly fuses the copper so that a bath of molten copper is provided beneath the corundum. The cathode is gradually raised until the arc is fully developed and the zone of fusion is extended in all directions in the form of a hemisphere around the tip of the cathode, whereby the alumina is caused to assume the form of a hollow crater. The intense heat causes the copper bath to boil by the vaporization of the copper, and the copper vapors circulate within the crucible, becoming condensed against the comparatively cool sides thereof and falling down as liquid copper through the mass of alumina, whereupon a circulation is created through the latter and as rapidly as the alumina is fused and its oxygen driven off the copper is caused to combine with the aluminium. When the alumina has been wholly reduced and its oxygen eliminated, there remains in the crucible a bath of molten aluminium bronze. The operation is then discontinued and the molten metal is poured or tapped out of the crucible. In case an ore of copper or other base metal is employed, this ore or part thereof is reduced in advance of the reduction of the alumina, or other refractory oxide. The oxygen eliminated from the alumina immediately combines with any incandescent carbon which it encounters, and is liable to attack the carbon-electrodes, the cathode, which is exposed, being attacked to the greatest extent, while the cup-shaped anode or crucible, which is protected by the copper bath, is eaten away but very little.

In the practice of my invention I aim to prevent as far as possible the wasting away of the carbon electrodes, since carbon in this form is an expensive fuel. In fact it is the aim of my invention to avoid as far as possible all heating by combustion, the furnace being operated as nearly as possible by electric heat alone. To this end, and because some oxidizable material is necessary in order to combine with the oxygen set free by the reduction of the ore, I introduce into the crucible some cheaper form of carbon than that of which the electrodes are made. I have found the use of carbon in the form of lamp-black or of crushed-coke, or the ground-up waste fragments of retort carbon advantageous. Or, coal dust or slack may be used. By thus supplying carbon in this form the wasting away of the carbon pencil or cathode is reduced to almost nothing. The particles of carbon thus introduced are oxidized in preference to the carbon pencil by reason of their fine subdivision and closer proximity to the most intense part of the arc, and to the material undergoing reduction.

Figure 2:
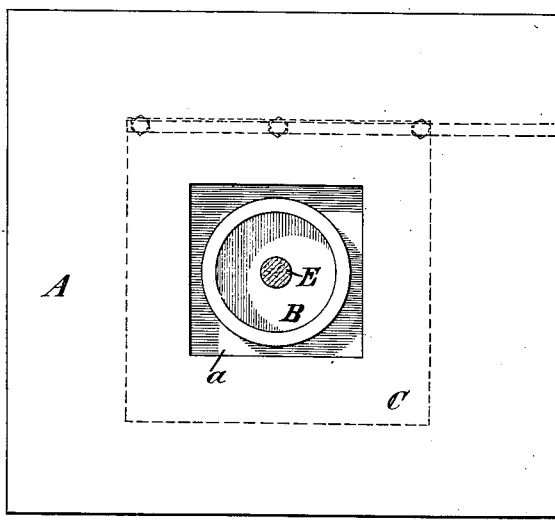
Figure 3:
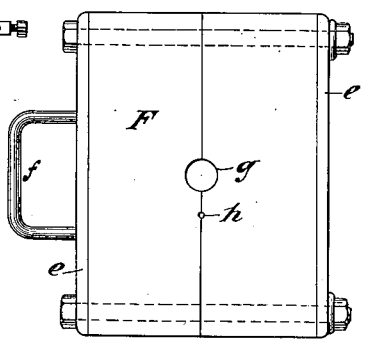
Figure 4:
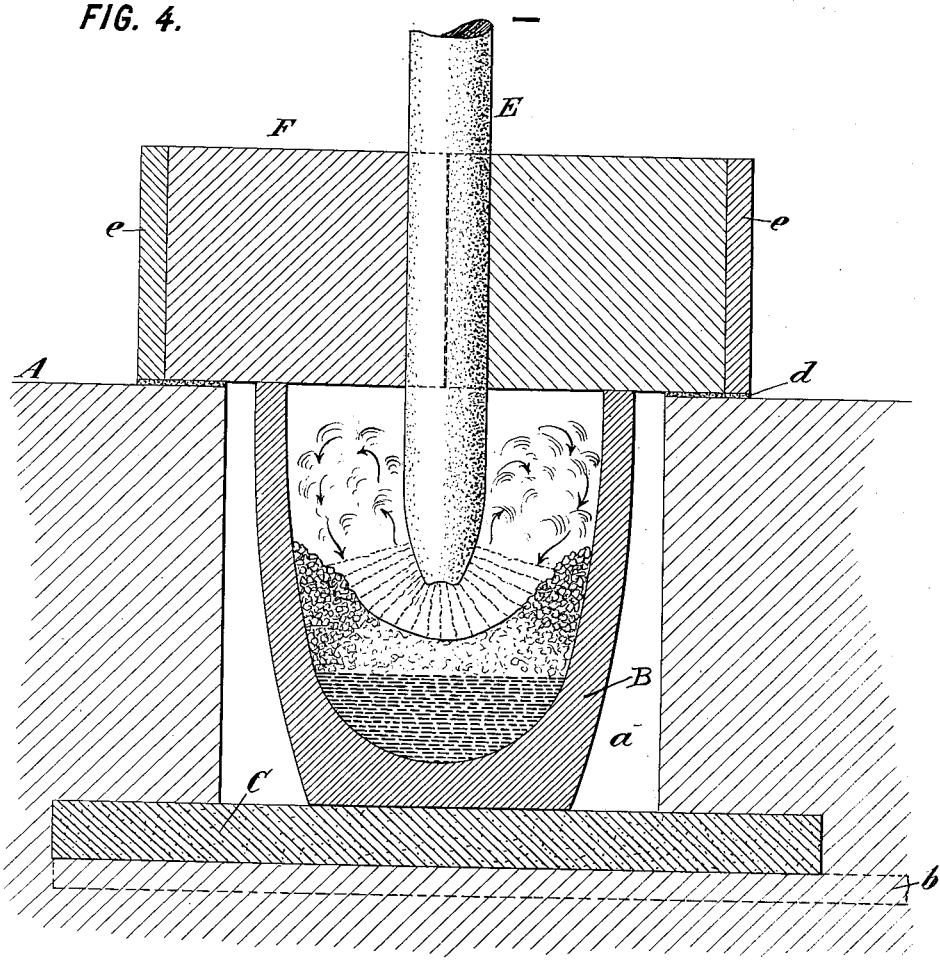

I will now proceed to describe the practical operation of my invention with reference to the accompanying drawings, wherein Figure 1 is a vertical transverse section of the form of electric smelting furnace employed in practicing my invention, including also on a smaller scale a diagrammatic elevation of the dynamo, showing the circuit connections. Fig. 2 is a plan of the furnace shown in Fig. 1, with the cover removed. Fig. 3 is a plan of the cover. Fig. 4 is a vertical section of the furnace on a larger scale showing it in operation.

Let A designate a suitable hearth or bench of brick-work constructed with an opening or recess $a$ of suitable size and shape within which is set a crucible B. A carbon plate C is built into the bench A and forms the bottom or floor of the opening $a$ so that the crucible rests on this plate. The brick-work immediately surrounding the opening $a$ should be constructed of fire-brick or other highly refractory material.

D designates the dynamo which of course may be of any suitable type adapted to generate a current of the requisite volume under suitable electro-motive force, and the positive and negative terminals of which are connected respectively with the carbon plate C and with a carbon pencil or electrode E. The connection with the carbon plate is made preferably through the medium of a bar of metal $b$ fastened by bolts to one edge of the carbon plate, as shown in dotted lines in Fig. 2, and its end projecting beyond the brick-work is provided with a socket and set-screw constituting it a binding-post into which the positive terminal of the wire $w$ is fastened. The connection of the carbon pencil E may be made by a clamp $c$ fastened on it at its upper portion and formed with a binding-post into which the end of the other wire $w'$ is fastened. The crucible B having been placed in the opening $a$ it is covered by placing over it a cover F which may rest either on the top of the crucible or on top of the brick-work A. A luting of fire-clay $d$, should be placed under this cover in order to prevent access of air to the crucible. The cover F may be readily made of two fire-bricks fastened together by iron bolts passed through their ends, as shown best in Fig. 3, thereby clamping them between iron bars or plates $e$ $e$, and may be provided or not with a handle $f$ by which to manipulate it through the medium of a poker or tongs. A cylindrical hole $g$ is formed vertically through the middle of the cover F and also a vent-opening $h$ which is preferably distinct from the hole $g$. The hole $g$ is made of such size as to admit the passage of the carbon pencil E through it with just sufficient friction to hold the carbon pencil at any height at which it may be placed.

This furnace may be operated for the reduction of aluminium and to produce aluminium bronze in the following manner, which is that by which I have obtained the most satisfactory results. I place in the bottom of the crucible a suitable quantity of copper suitably broken up, or of copper wire twisted or compacted into a mass of convenient shape, and on top of this a layer of a suitable quantity of alumina in the form of precipitated alumina or nearly pure corundum. I have found the best proportions to be two parts by weight of copper to one part by weight of alumina. The cover F is then placed over the crucible and luted down and the carbon pencil E thrust through it and pressed down through the layer of alumina until its tip touches the copper. The circuit connections being completed an electric current is passed through the electrodes B and E. The carbon pencil E is then lifted slightly to strike the arc and as the copper fuses it is lifted still higher until the maximum arc is formed. The arc is then to be maintained stationary. In a crucible containing about four or five pounds of materials I have used a current of two hundred ampères under a difference of potential of fifty volts at opposite terminals of the furnace.

Comminuted carbon is introduced either by mixing it with the ore before the latter is placed in the crucible, or by introducing it from time to time into the crucible through a suitable opening. The vent-hole $h$ may be utilized for thus introducing the carbon.

During the operation the copper is fused and set into ebullition by the heat from the electric arc, and the alumina is fused and decomposed, its oxygen combining with the carbon which it first encounters, which is chiefly the comminuted carbon which mixed with the ore will be exposed in the arc to the same heat which causes the liberation of the oxygen, and being finely subdivided and thereby readily incandescent, it is in condition to freely unite with the oxygen. The carbonic acid or carbonic oxide gas, (or both,) thus formed, escape through the vent $h$ and in the case of carbonic oxide in flames on issuing therefrom into contact with the external air. The aluminium set free enters at once into combination with the copper, forming an aluminium bronze. The operation consumes from fifteen minutes to two hours, depending upon the character of the alumina, the proportions of the ingredients and the strength of current. When the aluminium is completely reduced the current is discontinued, the carbon pencil lifted out, the cover F pushed off, the crucible lifted out and the molten bronze poured into a mold to form an ingot. The alloys I have made in this manner have varied between three per cent. and eighteen per cent. of aluminium.

I have made numerous experiments with different quantities and proportions of ingredients and different ores of aluminium, the best results having been obtained by the use of pure alumina with copper in the proportions stated and with a current of the character named. I have also used iron ore (oxide of iron) in connection with corundum and by smelting the two together have produced an aluminium steel of fine quality. I have also smelted iron ore or fragments of iron with a very small quantity of aluminium ore added thereto, and have made a fine quality of steel by passing the current through the furnace for a period of five minutes.

In my experiments I have used both the crucible as an anode and the carbon pencil as a cathode, and the crucible as a cathode and the carbon pencil as an anode. I have found the reducing effect to be the same in either case, there being ordinarily no perceptible difference in the rapidity of operation or in the product. I find, however, a considerable difference in the rapidity with which the electrodes are consumed, since when a current is passed downwardly the upper electrode or carbon pencil is consumed more rapidly than when the current is passed upwardly. It would seem that there is, as in an arc light, a tendency to the throwing off of particles of carbon from the anode to the cathode which when the current is passed downwardly causes the carbon pencil to waste away with comparative rapidity, while when the current is passed upwardly the tendency is to build up the carbon pencil by the attachment to it of the projected particles, but any actual building up of this electrode is prevented by the consumption of the carbon through oxidation. In either case the cup-shaped electrode is protected to great extent by the bath of copper and by the presence of alumina. When the current is passed upwardly the fumes of the copper, carrying with them a spray of the freed aluminium, are caused to fly toward the carbon pencil and circulate thence upwardly, and being condensed against the comparatively cool sides of the crucible, stream down the latter and protect it from oxidation. Another advantage of passing the current from the crucible as an anode, to the carbon pencil as a cathode is that the most intense heat, which as is well known is generated at the point of separation in the electric arc of the particles disrupted from the anode, is brought to the position where it is made most useful, namely, within the molten metallic bath. It thus causes an ebullition and vaporization of this bath, and an energetic circulation of the vaporized and liquefied metal within the crucible. The hottest electrode is thus the one which is immersed in the metallic bath, by which it is protected, while the heat is utilized to the best possible advantage in the bath.

Fig. 4 gives what I believe to be a fairly accurate representation of the operation and of the shape of the hollow or crater caused by the arc. It fails, however, to properly indicate the ebullition of the bath of copper although the circulation of the copper fumes is clearly indicated.

The improved process provided by my invention is not limited in its application solely to the reduction of aluminium, but is applicable to the reduction and alloying of other highly refractory metals of analogous character, such as boron, silicon, calcium, chromium, titanium, &c. By the partial melting down of the fire-clay used for the cover F, I have produced a bronze of aluminium and copper with silicon.

I contemplate employing instead of a cup-shaped crucible removable from the refractory brick-work or bench of the furnace, a crucible or vessel of different shape built permanently into the brick-work, with an outlet passage from its lower side for running out the metal or alloy at the close of the smelting operation after the manner of an ordinary cupola furnace.

I make no claim herein to anything claimed in my application, Serial No. 307,337, filed April 15, 1889, and I specifically disclaim in this application the following defined inventions which are in issue in two interferences in which said application is involved, namely:—A. "The process of reduction which consists in subjecting a bath of fused aluminous or like compound to the action of an electric current, in the presence of a molten metal capable of alloying with the metal reduced from said compound." B. "Process of reduction which consists in passing an electric current through a bath of a fused aluminous or like compound and a bath of molten metal in contact with said fused compound and capable of alloying with the metal reduced from said compound."

In the practice of my process it is essential to the proper formation and maintenance of the arc that the carbon pencil or cathode shall be out of contact not only with the bath of molten base metal but also with any other liquid or solid conducting substance such as would afford another path for the current of sufficiently low resistance to extinguish the arc. If the material to be reduced is a non-conductor, as alumina, the carbon pencil may be in contact with it, or even embedded in it, without impairing its action, but in case the material to be reduced is either itself a sufficiently good conductor, or is so intermixed with a good conductor as to afford a sufficient conducting path around the arc (as in case granulated carbon of sufficient conductivity is commingled with it in sufficient proportions) the material must not be permitted to remain in contact with the pencil to such extent as to afford so good a conducting path around the arc as to extinguish the arc.

My present invention relates to the same subject matter of invention as my application Serial No. 442,601, filed August 9, 1892, which claims a subsequently discovered improvement upon or development of the process claimed herein.

I claim as my invention:—

1. The herein described process of reducing refractory metallic oxides, consisting in subjecting them in the presence of comminuted carbon as a reducing agent to the heat of an electric arc passing between a molten metallic bath beneath and a carbon electrode above said bath, the electrode being out of contact with the molten bath and with any other conducting substance of sufficiently low resistance to extinguish the arc.

2. The herein described process of reducing refractory oxides which consists in subjecting them in the presence of a base metal to be alloyed therewith, to the heat of an electric arc passing between the molten bath of said base metal and a carbon electrode above said bath in the presence of comminuted carbon as a reducing agent, the electrode being out of contact with the molten bath and with any other conducting substance of sufficiently low resistance to extinguish the arc.

3. The herein described process of reducing refractory oxides which consists in subjecting them to the action of an electric arc passing upwardly from an anode consisting of a molten bath of a base metal beneath to a cathode above said bath in the presence of comminuted carbon as a reducing agent, the electrode being out of contact with the molten bath and with any other conducting substance of sufficiently low resistance to extinguish the arc whereby said comminuted carbon combines with the liberated oxygen and protects the cathode from oxidation.

4. The herein described process of producing aluminium alloys which consists in subjecting alumina in the presence of comminuted carbon as a reducing agent to the heat of an electric arc passing between a molten bath of base metal and a carbon electrode above said bath the electrode being out of contact with the molten bath and with any other conducting substance of sufficiently low resistance to extinguish the arc, whereby the oxygen freed by the decomposition of the alumina combines with said comminuted carbon and its corrosion of the carbon electrode is prevented.

5. The herein described process of producing aluminium alloys which consists in subjecting alumina to the action of an electric arc passing upwardly from an anode consisting of a molten bath of base metal beneath to a cathode above said bath and out of contact therewith and with any other conducting substance of sufficiently low resistance to extinguish the arc, and in the presence of comminuted carbon as a reducing agent, whereby the oxygen freed by the decomposition of the alumina combines with said carbon so that corrosion of the cathode and the crucible by it is avoided, and the liberated aluminium is dissolved in the bath of base metal, forming an alloy therewith.

In witness whereof I have hereunto signed my name in the presence of two subscribing witnesses.

THOMAS L. WILLSON.

Witnesses:
GEORGE H. FRASER,
CHARLES K. FRASER.